United States Patent [19]
Andersson et al.

[11] Patent Number: 5,250,321
[45] Date of Patent: Oct. 5, 1993

[54] METHOD OF PRINTING A GLASS PANE WITH A DECORATIVE COATING REACHING THE PERIPHERAL FACE OF THE GLASS PANE

[75] Inventors: Kjell Andersson, Hassleholm; Carl Liden, Eslov; Raimo Eronen, Molnlycke, all of Sweden; Hans Ohlenforst, Aachen, Fed. Rep. of Germany; Dieter Hahn, Ubach - Palenberg, Fed. Rep. of Germany; Jean-Pierre Lacoste, Aachen, Fed. Rep. of Germany

[73] Assignee: Saint-Gobain Vitrage International, Courbevoie, France

[21] Appl. No.: 851,795

[22] Filed: Mar. 16, 1992

[30] Foreign Application Priority Data

Mar. 23, 1991 [DE] Fed. Rep. of Germany ....... 4109710

[51] Int. Cl.$^5$ ............................................. B05D 5/06
[52] U.S. Cl. .................................... 427/163; 427/282; 427/287; 101/126; 118/505; 264/132; 264/275
[58] Field of Search ............... 427/163, 165, 272, 282, 427/287; 65/60.1; 118/505; 101/126, 123; 264/129, 132, 138, 275; 156/99, 107

[56] References Cited

U.S. PATENT DOCUMENTS 4,268,545  5/1981  Hodulik ............................. 427/282

Primary Examiner—Terry J. Owens
Attorney, Agent, or Firm—Oblon, Spivak, McClelland, Maier & Neustadt

[57] ABSTRACT

In a method of making a glazing pane (1), printed with a decorative frame (15), in which the decorative frame (15) extends right to the peripheral surface (6) of the glass pane (1) independently of edge tolerances of the glass panes and of positioning tolerances of the glass pane and of the printing tools during the printing operation, a profiled strand (13), which extends the surface of the glass pane (1) beyond its peripheral face (6) is integrally formed immediately adjoining the peripheral face (6). The decorative frame (15) is printed on beyond the peripheral edge of the glass pane (1) and onto the profiled strand (13). After the printing ink has dried, the profiled strand (13) is removed from the glass pane (1).

15 Claims, 4 Drawing Sheets

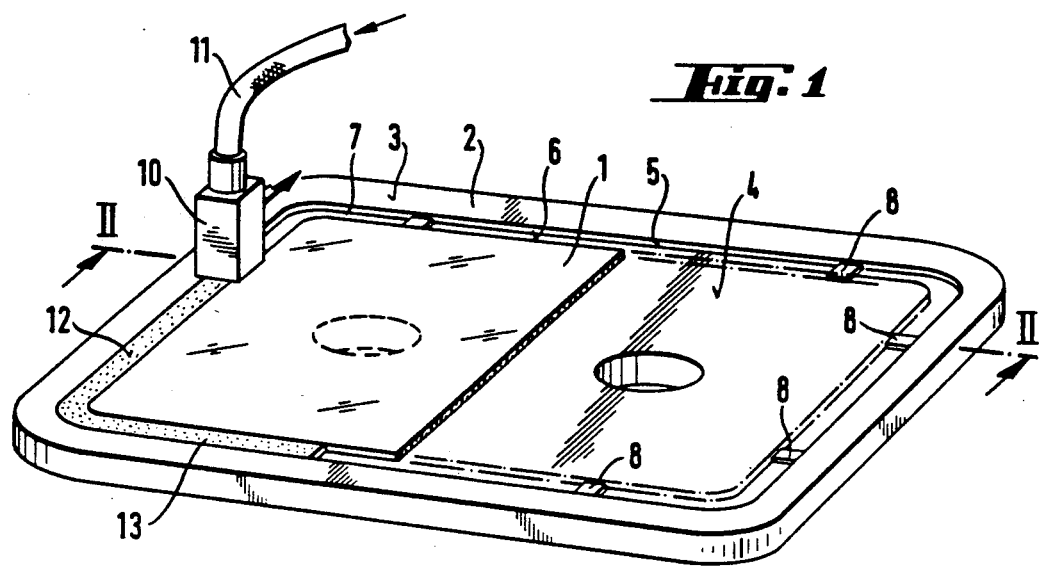
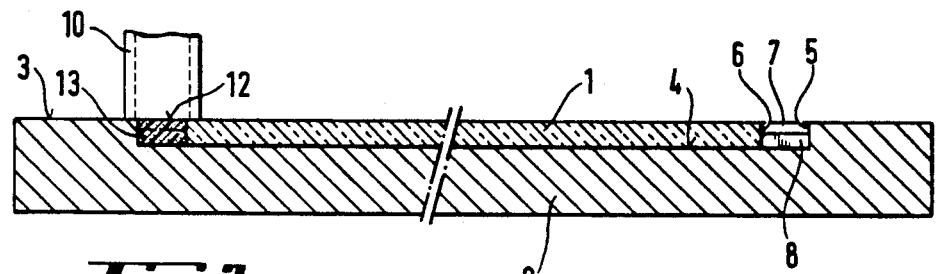
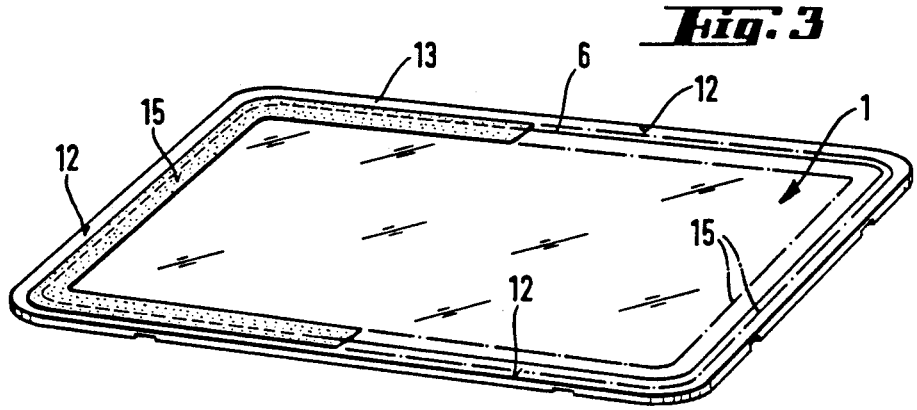

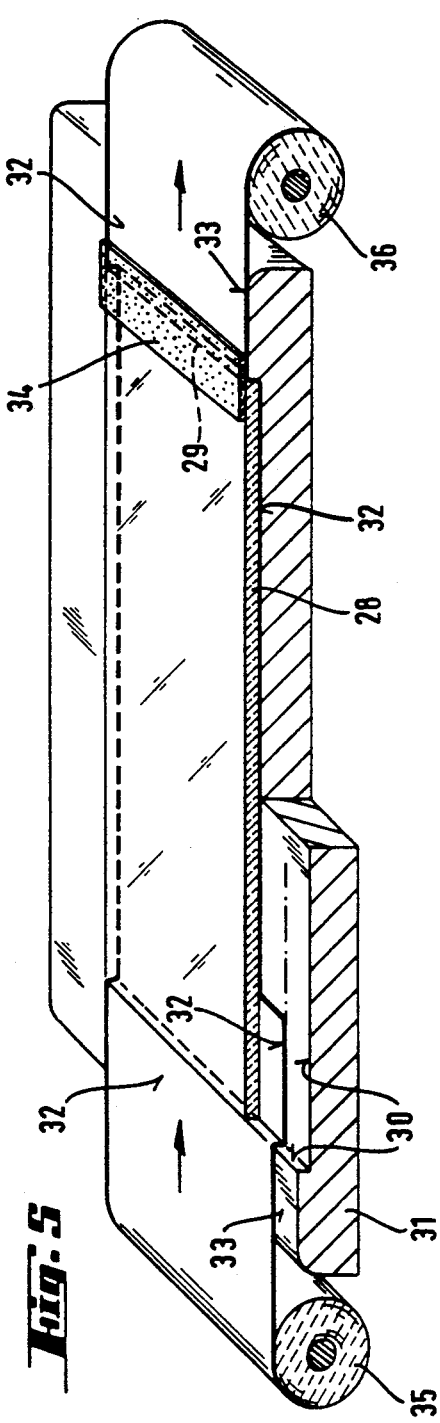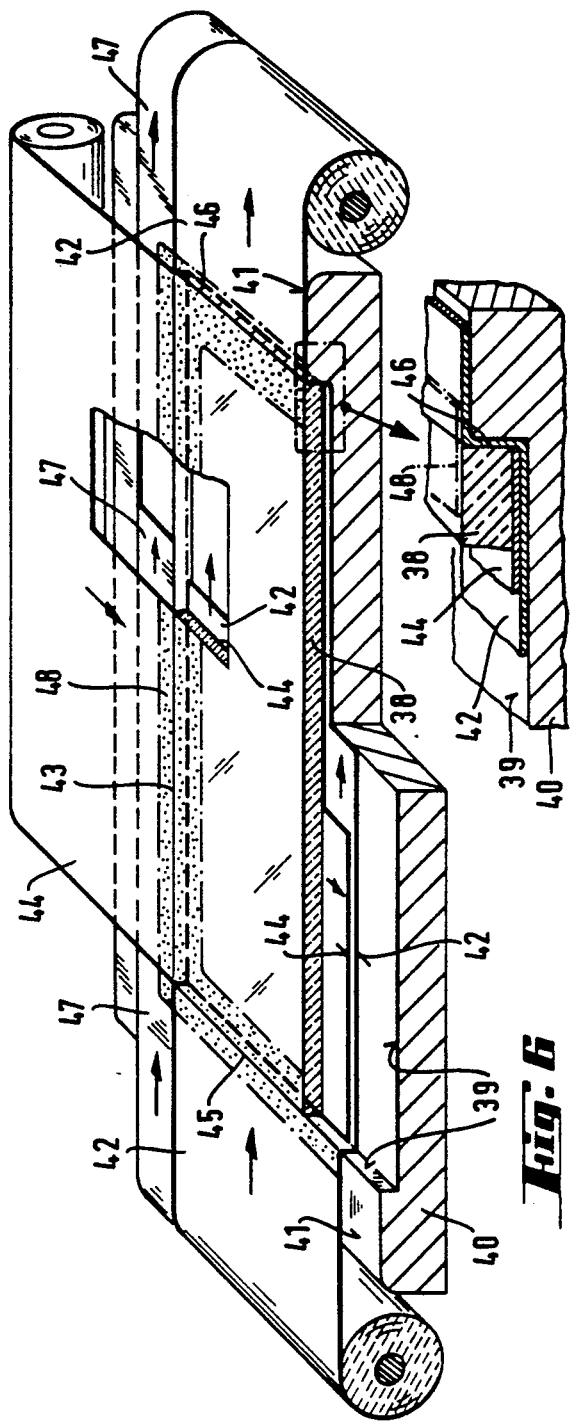

METHOD OF PRINTING A GLASS PANE WITH A DECORATIVE COATING REACHING THE PERIPHERAL FACE OF THE GLASS PANE

BACKGROUND OF THE INVENTION

1. Field of the Invention

This invention relates to a method of printing a glass pane with a decorative coating, which extends at least in a selected zone right up to the peripheral face of the glass pane.

2. Description of the Related Art

Automobile glass panes are frequently provided along one edge or along the entire periphery of the pane with an opaque decorative coating or film, typically as a baking finish. For applying the decorative coating onto the glass surface, screen-printing has proved especially suitable. The printing ink is usually baked on at temperatures of 550° to 600° Celsius or higher during the course of the heat-treatment necessary for bending and/or toughening the glass panes.

The glass panes in the installed condition are now frequently no longer covered by a profiled frame encompassing the pane at the edge or fitting over the edge, but instead the glass panes are visible from the outside right up to their edges. This means that the decorative print at the edge is visible right up to the periphery of the glass pane. Irregularities in the outer boundary of the decorative frame, especially slightly differing distances between the outer boundary of the decorative frame and the edge of the glass pane, can have a very adverse appearance. A considerable interest therefore exists in being able to print the colored coating forming the decorative frame in selected regions or along the entire periphery of the glass pane right up as far as the peripheral edge.

In the usual printing processes, especially in screen printing, it is difficult for various reasons to carry out an exact decorative application accurately right up to the edge of the glass pane. On the one hand, the glass panes as a rule have certain admissible dimensional tolerances, whereas they are all printed using the same printing template. The positioning operations of the glass panes to be printed and of the printing tools are also accompanied by tolerances, which may be additive to the dimensional tolerances of the glass panes. If the part of the screen printing template permeable to the printing ink projects beyond the edge of the glass pane, the printing ink adheres to the lower face of the screen printing template at these locations and the template becomes unusable. To overcome this difficulty, therefore, the application of the color in the screen printing process is usually performed only up to a distance from the edge of the pane which allows for the most unfavorable case. Printing up to the edge of the glass with accuracy of area is, however, not possible in series printing by means of the screen printing process in the state of the art.

SUMMARY OF THE INVENTION

An object of the present invention is to create a method, in which independently of the area tolerances of the glass panes and independently of positioning tolerances during the printing operation, the applied decorative coating or film extends at least in a selected zone right up to the peripheral edge of the glass pane.

According to the invention, this object is achieved in that, at least in the selected region of the glass pane, a border element which forms a substantially coplanar continuation of the surface to be printed beyond the edge of the glass pane is disposed immediately adjoining the edge of the glass pane. The decorative coating is printed beyond the edge of the glass and onto the border element. After the printing ink has dried, the border element is separated from the glass pane.

In the method according to this invention, the printing template is so constructed that the printed area, even in the most unfavorable case of dimensional tolerances and positioning conditions, always extends by about several millimeters beyond the edge of the glass pane. In this way the printing ink is not only applied up to the edge of the glass, but furthermore onto a surface adjoining thereto, which forms, together with the adjacent glass surface, a more or less cohesive and continuous flat face. The border element projecting beyond the edge of the glass pane is separated from the glass pane after the printing ink has dried. The border element may, perhaps, be used again for printing the next glass pane. In a favorable further embodiment of the invention, however, the border element released from the glass pane after the printing operation is discarded, and a new, unused border element is employed for each glass pane.

The method of this invention can be carried out in various ways.

For example, according to a first embodiment of the method, a profiled strip of a settable material of some millimeters thickness and rectangular cross-section can be glued onto the peripheral surface of the glass pane in such a manner that a plane boundary surface of the profiled strip forms a continuation of the surface of the glass pane.

According to another embodiment, the border element is formed of a castable or extrudable, hardening inorganic or organic material directly molded against the peripheral face of the glass pane. The forming of the border element may be carried out by means of a mold surrounding the glass pane, which forms a gap corresponding to the border element, which is then filled with the hardening material. Instead, however, the border element having the desired cross-section can be formed directly against the peripheral face of the glass pane by means of a suitable extrusion nozzle. For these embodiments, thermoplastic and thermosetting polymers are especially suitable.

A further embodiment consists in that the border element adjoining the glass edge is formed of a flexible sheet, especially a paper sheet, which is held at the level of the glass surface by a supporting body situated adjacent to the glass pane. The supporting body situated adjacent to the glass pane may, for example, be a template-like frame, into which the glass pane is laid with a sheet of tissue paper between them.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows an apparatus for forming a peripheral edge strip by means of an injection mold;

FIG. 2 shows a section on the line II—II in FIG. 1;

FIG. 3 shows a glass pane printed with a decorative frame before removal of the edge strip;

FIG. 5 shows a mold for receiving the glass pane during the printing operation, with a paper sheet forming the adjoining boundary element;

FIG. 6 shows a mold for receiving the glass pane during the printing operation, with a plurality of paper sheets surrounding the glass pane along its entire periphery.

DETAILED DESCRIPTION OF THE PREFERRED EMBODIMENTS

Figure 4:
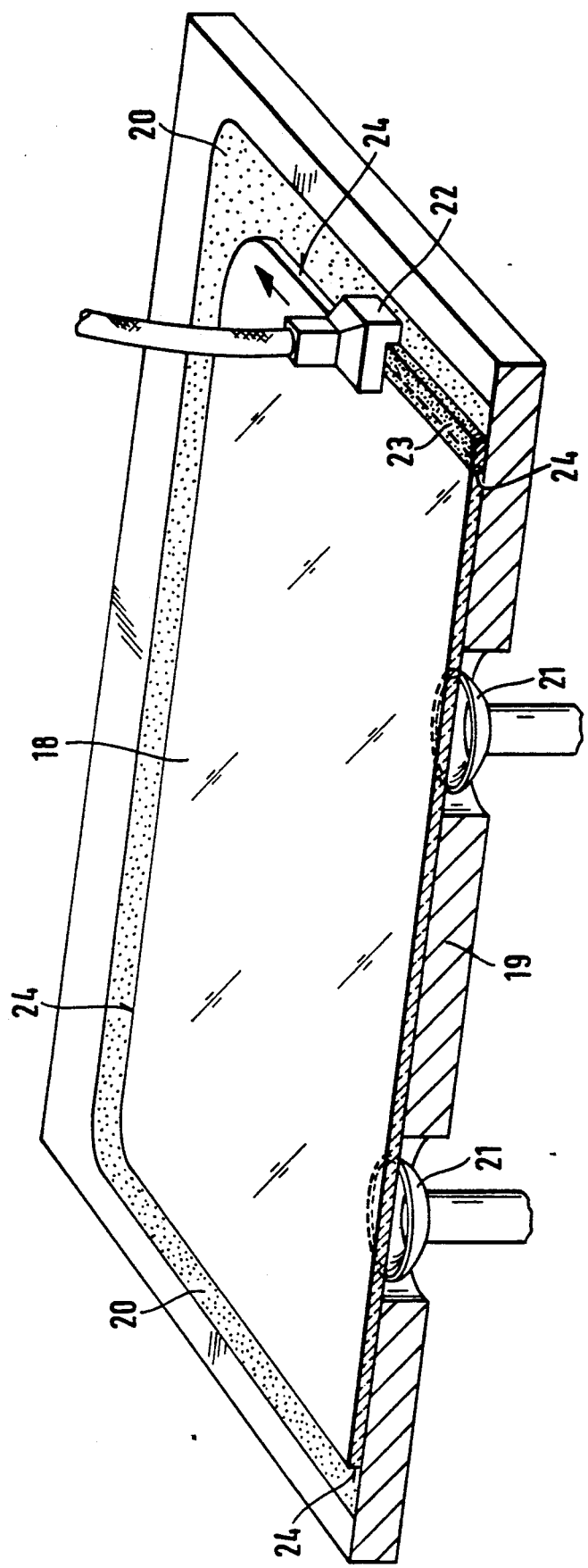
FIG. 4 shows an apparatus for molding-on an edge strip onto a glass pane by means of a calibrated molding nozzle.

With reference to FIGS. 1 to 3, a first embodiment of a method of the invention is now described, wherein a glass pane 1 is provided, along its entire periphery, with an edge strip. For this purpose a mold 2 has a plane surface 3 and a recess 4. The shape of the inner boundary wall 5 of the recess 4 corresponds to the shape of the peripheral face 6 of the glass pane 1, but is larger than the area of the glass pane. When the glass pane 1 is laid in this mold, a gap 7 remains between the peripheral face 6 of the glass pane and the boundary wall 5 of the recess 4. The recess 4 is so dimensioned or constructed that the top surface of the glass pane 1 lies in the same plane as the surface 3 of the mold 2. In order to establish the position of the glass pane 1 inside the recess 4, spacer elements 8 are disposed at the edge of the recess.

Before the glass pane 1 is placed in the mold 2, the mold is coated, in the region of the boundary wall 5, with a suitable parting agent. The gap 7 between the peripheral face of the glass pane and the boundary wall 5 of the recess 4 is then filled by means of an injection nozzle 10, which is supplied via a hose 11, with a setting polymer material. The upper surface 12 of the thus formed, frame-shaped profile strip 13 lies in the same plane as the surface of the glass pane 1 and constitutes the boundary element extending beyond the peripheral edge of the glass pane 1.

When the gap 7 has been filled in this manner, the polymer is allowed to set. The glass pane 1, together with the profiled strip 13 adhering to the peripheral face 6, is then removed from the mold 2.

As a polymer the profiled strip 13, thermoplastics such as polyvinylchloride (PVC), or reaction systems such as polyurethanes, may be used. Inorganic setting materials and systems may, of course, also be used for producing the profiled strip 13.

The glass pane 1, provided in this manner with a peripheral profiled strip 13, is then printed with the decorative frame 15 as illustrated in FIG. 3. The external dimensions of the printing template are so selected that the printing ink covers a portion of the surface 12 of the peripheral strip 13 beyond the glass surface, along the entire circumference of the glass pane 1. The printing operation is preferably performed by the silk screen method.

When the printing ink forming the decorative frame 15 has dried, the edge strip 13 can be removed from the glass pane 1. The glass pane 1 can then be further processed in the usual manner. For example, after being heated to bending temperature, it may be bent and then toughened. The edge strip 13 will advantageously be removed just before the glass pane is placed on the roller conveyor of the furnace in which the glass pane is heated to its bending and toughening temperature. In this way, the frame-like edge strip 13 serves, during the intermediate stacking and handling operations, as an effective edge protection for the glass pane.

Another method by which the glass pane may be equipped with an edge strip is illustrated schematically in FIG. 4. In this case, the glass pane 18 is laid on a flat plate 19, which has previously been provided in the peripheral region of the glass pane 18 with a coating 20 of parting agent. The glass pane 18 is held on the plate 19, for example by means of suction cups 21. Then an extrusion nozzle 22 having an appropriately calibrated nozzle aperture is moved along the periphery of the glass pane 18 and so extrudes a profiled strip 23 directly against the peripheral face 24. The extrusion nozzle 22 is moved automatically along the peripheral face 24 of the glass pane 18 by means of a appropriately programmed robot. The nozzle opening of the extrusion nozzle 22 is so calibrated that the upper face of the profiled strip 23 forms the border element constituting the extension to the surface of the glass pane 18. When the profiled strip 23 has hardened, the glass pane 18 is removed from the plate 19.

The plate 19 may, for example, be of polytetrafluoroethylene or another material to which the profiled strip extruded by the extrusion nozzle 22 does not adhere. In this case it is unnecessary to apply a parting agent coating onto the plate 19.

The method illustrated in principle in FIG. 4 can also be carried out according to another especially advantageous variant by the incorporation of a sheet of paper or of plastic foil between the flat plate 19 and the glass pane, the glass pane being laid on this sheet. This paper or plastic sheet, after the profiled strand 23 has been applied onto the edge of the glass pane, is brought together with the glass pane into the succeeding screen printing station and into the drying oven, in which the screen printing ink is dried.

The printing-on of the decorative frame and further processing of the glass pane take place in the same manner as in the first described embodiment.

FIG. 5 illustrates the basic construction of a device by means of which the border element forming a continuation of the glass area is formed of a paper sheet or suitable foil. In the illustrated case, a rectangular glass pane 28 is to be printed, along one edge 29, with a decorative strip. For this purpose, the glass pane 18 is laid in the recess 30 corresponding to the shape and thickness of the glass pane, of a support plate 31. A paper sheet 32 is previously stretched over the recess 30, this paper being rolled from a storage roll 35 and, after the printing operation, being wound onto the roll 36. When the glass pane 18, with the paper sheet 32 below it, is laid in the recess 30, the paper sheet lies over the mold surfaces 33, adjoining the recess 30, which are at the same level as the surface of the glass pane 28.

The glass pane 28 is printed with the decorative strip 34 while it is lying in the manner illustrated inside the support plate 31. After the printing operation, the glass pane can be removed immediately out of the support plate 31. The paper sheet 32 is moved onwards by a specific length and rolled onto the reel 36, and the device is ready for the next printing operation.

If, on the principle described in relation to FIG. 5, a glass pane is to be provided along its entire periphery with a frame-shaped decorative print, a device may be used for this purpose which has the basic construction illustrated in Fig. 6. The glass pane 38, here again, is placed in the recess 39 of a support plate 40, the surfaces 41 of which, adjoining the recess 39, are at the same level as the surface of the glass pane 38, if necessary taking into account the thickness of the paper sheet. In this case, the entire region of the surface 41 laterally adjoining the recess 39 is covered by paper sheets. While one paper sheet 42 is stretched in a direction parallel to the edge 43 of the glass pane 38, a second paper sheet 44 is stretched transversely to the paper sheet 42 over the support plate 40. The width of the two paper sheets 42, 44 in each case corresponds to the width of the recess 39 in the relevant direction. In this manner the regions of the surface 41 of the mold 40 adjacent to the edges 43, 45, 46 of the glass pane are covered by the paper sheets. The corner areas of the mold face 41 remaining between the two paper sheets 42, 44 are covered by a further paper sheet 47. The paper sheet 47 can be comparatively narrow and fits tightly against the paper sheet 42. It is disposed underneath the paper sheet 44, so that in the region of the edge 43 of the glass pane only the paper sheet 44 forms the border element adjoining the glass surface. As described in connection with FIG. 5, the paper sheets 42, 44, 47 are first stretched over the support plate 40. The glass pane 38 is then laid on the paper sheets 42, 44 and, together with them, placed in the recess 39. The glass pane is then, as it lies in the support plate, printed with the decorative frame 48, for example by the screen printing method. When the printing ink has dried sufficiently, the glass pane is removed from the recess 39 and separated from the paper sheets. The glass pane is then further processed in the usual manner.

Figure 7:
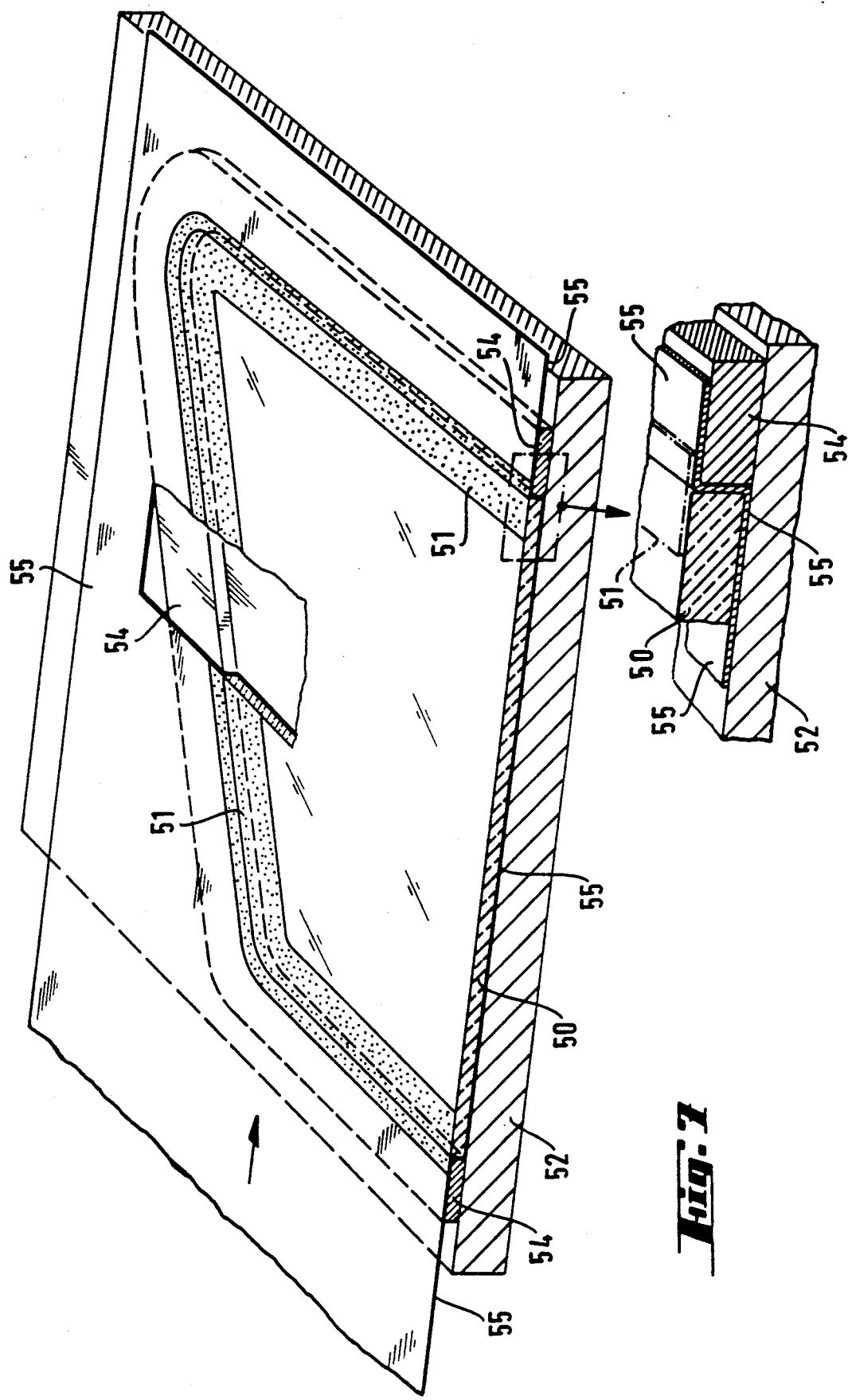
FIG. 7 shows another form of embodiment of an apparatus for receiving a glass pane during the printing operation, with a paper sheet surrounding the glass pane on all sides.

The apparatus illustrated partly in FIG. 7 also is suitable for providing a glass pane 50 of any peripheral shape with a frame-shaped decorative print 51, extending right to the peripheral edge of the pane. In this case, the apparatus comprises a table 52 having a plane surface, on which a template-like frame 54, corresponding in thickness to the glass pane 50, is mounted. The internal peripheral shape of the frame 54 corresponds to the outer peripheral shape of the glass pane 50. Over the frame 54, a sheet 55 of a suitable tissue paper or suitable textile fabric or plastic sheet is stretched, which lies on all sides over the frame 54 when the glass pane 50 is laid inside the frame 54 on the table 52. The material forming the sheet 55 must, of course, be very thin and also sufficiently flexible and deformable for no perturbing folds to be formed in the corner regions of the frame 54. The decorative frame 51 is printed on in the manner described in the preceding examples by means of the silk screen method, beyond the edge of the glass pane and onto the paper sheet 55. The glass pane 50, together with the frame 54 and paper sheet 55, are thereafter slid into an adjoining drying station. After the printing ink has dried, the glass pane 50 is removed from the paper sheet 55 and further processed.

Obviously, numerous modifications and variations of the present invention are possible in light of the above teachings. It is therefore to be understood that within the scope of the appended claims, the invention may be practiced otherwise than as specifically described herein.

What is claimed as new and described to be secured by Letters Patent of the United States is:

1. A method of printing a glass sheet with a decorative coating, comprising the steps of:
   forming, in at least a portion of the glass sheet, a border element comprising a substantially coplanar continuation of the surface of the glass sheet to be printed, the border element abutting the edge of the glass sheet;
   printing the decorative coating on the surface to be printed at the portion, the coating extending to and beyond the edge of the glass sheet and onto the border element; and
   after permitting the coating to dry, separating the border element from the glass sheet,
   wherein said forming of said border element comprises gluing a profiled strip of an elastically deformable material onto the peripheral face of the glass sheet.

2. The method of claim 1, wherein said printing step comprises a screen printing step.

3. A method of printing a glass sheet with a decorative coating, comprising the steps of:
   forming, in at least a portion of the glass sheet, a border element comprising a substantially coplanar continuation of the surface of the glass sheet to be printed, the border element abutting the edge of the glass sheet;
   printing the decorative coating on the surface to be printed at the portion, the coating extending to and beyond the edge of the glass sheet and onto the border element; and
   after permitting the coating to dry, separating the border element from the glass sheet,
   wherein said forming of said border element comprises molding a strand of a settable material onto the peripheral face of the glass sheet.

4. The method of claim 3, wherein said settable material is a polymer material.

5. The method of claim 4, wherein said settable material is a thermoplastic polymer.

6. The method of claim 4, wherein said settable material is a single component reaction system.

7. The method of claim 3, wherein said forming of said border element comprises:
   placing the glass sheet in a recess of a mold such that a gap is left between the peripheral face of the glass sheet and a boundary wall of the recess; and
   filling the gap with the settable material.

8. The method of claim 3, wherein said forming of said border element comprises:
   placing the glass sheet on a support plate larger than the glass sheet; and
   moving a calibrated extrusion nozzle around the peripheral face of the glass sheet while extruding the settable material from the nozzle.

9. The method of claim 7 including the step of applying a parting agent to the mold recess.

10. The method of claim 8 including the step of applying a parting agent to the support plate.

11. The method of claim 4 wherein said settable material is a multi-component reaction system.

12. A method of printing a glass sheet with a decorative coating, comprising the steps of:
   forming, in at least a portion of the glass sheet, a border element comprising a substantially coplanar continuation of the surface of the glass sheet to be printed, the border element abutting the edge of the glass sheet;

printing the decorative coating on the surface to be printed at the portion, the coating extending to and beyond the edge of the glass sheet and onto the border element; and after permitting the coating to dry, separating the border element from the glass sheet, wherein said forming of said border element comprises:

placing the glass sheet in a recess of a mold; and supporting a sheet on a surface portion of the mold adjoining the edge of the glass sheet.

13. The method of claim 12, wherein said sheet is a first continuous sheet extending into the recess, said glass sheet overlying said sheet in said recess.

14. The method of claim 13 including supporting on a surface portion of the mold adjoining the edge of the glass sheet a second continuous sheet extending into said recess and in a direction transverse to the first thin sheet.

15. The method of claim 14, including supporting by the mold surface 2 sheet at crossing points of the first and second sheets so as to form the border element at corners of said mold recess.

* * * * *